Figure 1:
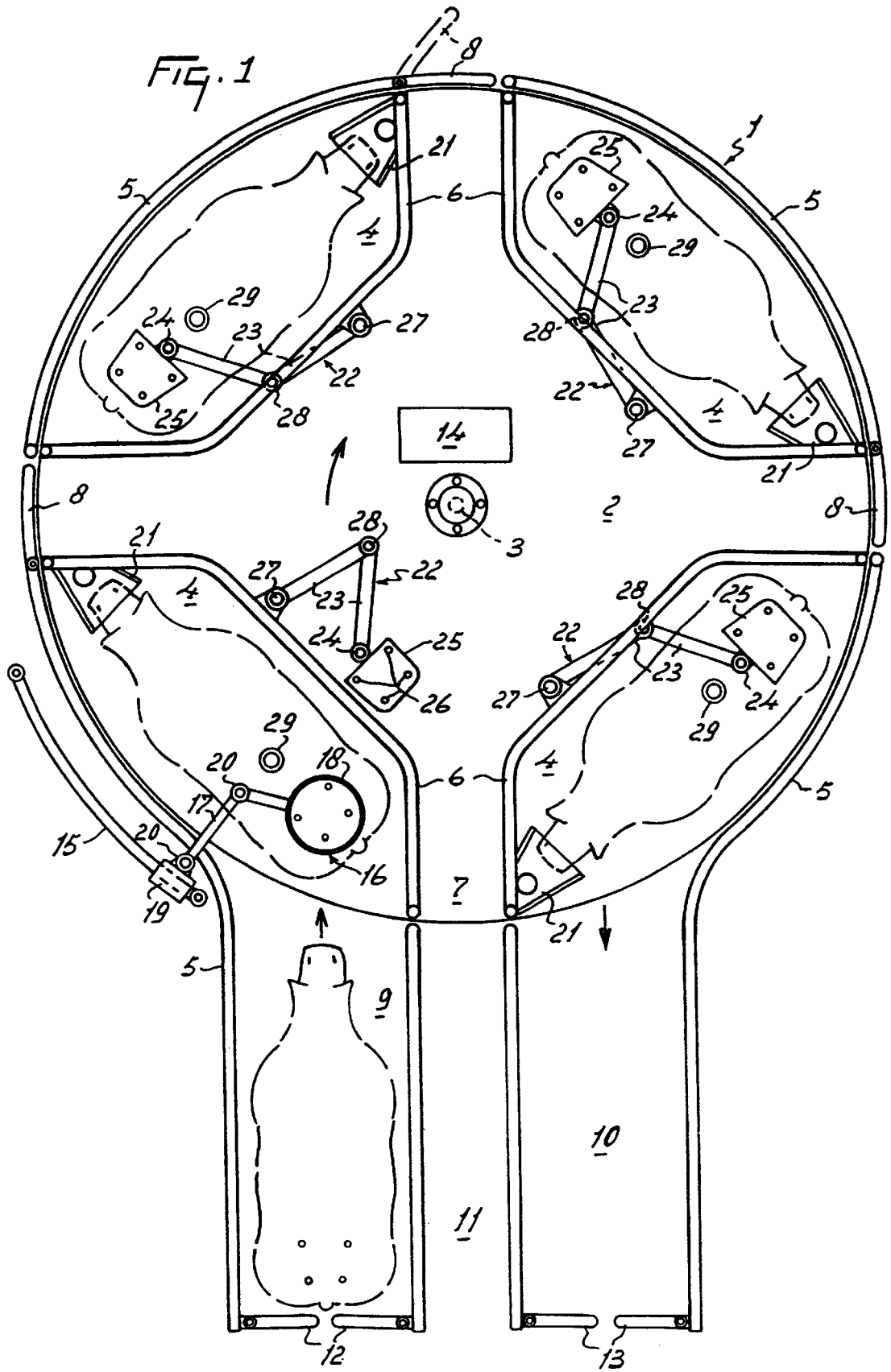

United States Patent [19]
van der Lely

[11] Patent Number: 6,050,219
[45] Date of Patent: Apr. 18, 2000

[54] APPARATUS FOR MILKING ANIMALS

[76] Inventor: Cornelis van der Lely, 7 Brüschenrain, CH-6300 Zug, Switzerland

[21] Appl. No.: 08/999,628

[22] Filed: Dec. 3, 1997

Related U.S. Application Data

[63] Continuation of application No. PCT/NL97/00161, Mar. 28, 1997.

[30] Foreign Application Priority Data

Apr. 4, 1996 [NL] Netherlands ............................ 1002792

[51] Int. Cl.⁷ ............................... A01K 1/12; A01J 5/017
[52] U.S. Cl. ...................... 119/14.08; 119/14.04
[58] Field of Search ............................ 119/14.02, 14.03, 119/14.04, 14.08, 14.1, 520

[56] References Cited

U.S. PATENT DOCUMENTS

| | | | |
|---|---|---|---|
| 1,987,955 | 1/1935 | Hapgood | 119/14.04 |
| 3,095,854 | 7/1963 | Bott et al. | 119/14.04 |
| 3,762,370 | 10/1973 | Gulleson | 119/14.03 |
| 3,835,814 | 9/1974 | Jacobs et al. | 119/14.04 |
| 4,508,058 | 4/1985 | Jakobson et al. | 119/14.04 |
| 5,784,993 | 7/1998 | Othues et al. | 119/14.04 |
| 5,842,436 | 12/1998 | Van Der Lely | 119/14.08 |
| 5,865,138 | 2/1999 | Van Der Lely | 119/14.02 |

*Primary Examiner*—Peter M. Poon
*Assistant Examiner*—Elizabeth Shaw
*Attorney, Agent, or Firm*—Penrose Lucas Albright

[57] ABSTRACT

An apparatus for milking animals, such as cows, comprising a movable floor which carries four milking compartments. Each milking compartment has a computer controlled milking robot. The movable floor may be a rotating circular platform on which the four milking compartments are located adjacent its periphery. The platform's rotary motion is governed by an automatically operative adjusting mechanism on the basis of the estimated milking time of the animals being milked in milking compartments on the platform or on their estimated residence time thereon. Each animal as it enters into a milking compartment on the platform is identified by an identification system. Also provided are guide members that extend around the periphery of the platform. Mounted on the guide members are a foremilking device, an udder massage device, an udder cleaning device, and a robot for replacing teat cups which may have fallen from the teats of animals being milked.

26 Claims, 2 Drawing Sheets

APPARATUS FOR MILKING ANIMALS

RELATED APPLICATION

This is a Continuation Application of PCT Application No. PCT/NL97/00161, filed Mar. 28, 1997.

The invention relates to a construction including an implement for milking animals, such as cows, said implement comprising a movable floor including one or more milk boxes and one or more milking robots.

Such constructions are known.

In such a construction the movable floor will be movable at a constant speed. During the connecting of the teat cups and during the milking of the animal, the animal is moved together with the movable floor. After the floor has been moved over a certain distance, the animal can leave said floor via an exit. For each animal the distance over which it is moved and the duration of this movement are constant, because all the animals are moved at a constant speed in the direction of the exit.

The above-mentioned construction has the disadvantage that the speed at which the animals are moved from the entrance to the exit is determined by the animal of the herd requiring the longest time to be connected and to be milked. When the latter animal has not occupied the movable floor, this implies that the other animals must be moved unnecessarily slowly from the entrance to the exit, which results in a decrease in capacity of the implement for milking animals.

The invention aims at obviating the above-mentioned drawbacks or at least minimizing same.

In accordance with the invention, this is achieved in that the implement is provided with at least one automatically operative adjusting mechanism for adjusting the speed of the movable floor on the basis of at least the estimated milking time of the cows on the movable floor or the estimated residence time on the movable floor. In this manner there can be achieved a higher occupancy rate of the implement for milking animals, which will result in a higher yield.

In a first embodiment according to the invention, the movable floor is designed as a conveyor belt, while in a second embodiment the movable floor is designed as a carrousel floor.

Therefore, the invention also relates to a construction including an implement for milking animals, such as cows, which implement comprises a carrousel including at least one milking robot and a number of milk boxes, characterized in that the implement is provided with an adjusting mechanism for adjusting the speed of rotation of the carrousel on the basis of at least the estimated milking time or the estimated residence time in the carrousel.

In accordance with an inventive feature, the adjusting mechanism cooperates with a computer comprising a memory in which historical data regarding the estimated residence time are stored. In this manner it will be possible, on the basis of the estimated residence time, to adjust the speed at which the movable floor is moved. In accordance with an other inventive feature, the adjusting mechanism cooperates with a computer comprising a memory in which historical data regarding the estimated milking time are stored, and the computer determines the estimated milking time on the basis of these data and the milk speed determined by the milk speed meter during milking. Due to the fact that each time the actual milk speed is determined, it will be possible to define the estimated milking time rather accurately and to adjust same if required.

According to again an other aspect of the invention, the computer determines the estimated milking time or the estimated residence time, in the first case on the basis of the average milking time of the animals present in the carrousel, and in the second case on the basis of the average residence time of the animals in the carrousel. In this manner it will be possible to achieve a high occupancy rate of the above-mentioned implement.

According to again an other aspect of the invention, the computer determines the estimated milking time or the estimated residence time, in the first case on the basis of the longest estimated milking time of the animal in the carrousel, and in the second case on the basis of the longest estimated residence time of the animal in the carrousel. In this manner there is reserved for all the animals sufficient time for milking them.

In accordance with an inventive feature, the carrousel comprises a platform, which is rotatable about a central shaft. Therefore, the invention also relates to a construction including an implement for milking animals, such as cows, said implement comprising a carrousel including at least one milking robot and a number of milk boxes, characterized in that the carrousel comprises a platform, which is rotatable about a central shaft. According to a further inventive feature, the carrousel or the conveyor belt comprises at least one foremilking device, one udder massage device, one udder cleaning device and one concentrate rationing device. Therefore, the invention further relates to a construction including an implement for milking animals, such as cows, provided with a carrousel or a conveyor belt, including at least one milking robot and a number of milk boxes, characterized in that the carrousel or the conveyor belt comprises at least one foremilking device, one udder massage device, one udder cleaning device and one concentrate rationing device.

In order to be able to enter the rotary platform, according to a further inventive feature, between two milk boxes there is provided a walking path which is closed off by a door. According to again an other inventive feature, the animals can enter the carrousel or the conveyor belt via a computer-controlled entrance and exit door located next to each other. In order to be able to select which animals are to enter the carrousel or the conveyor belt, according to an inventive feature, there is provided a cow identification system near the entrance door.

In accordance with an inventive feature, near the entrance door, along the circumference of the carrousel or along the conveyor belt, there is provided a guide means, such as a rail, via which the foremilking device and/or the udder massage device and/or the udder washing device and/or a milking robot are movable. According to a further inventive feature, the guide means is disposed along a sector of approximately 45° of the circumference of the platform. In accordance with a further aspect of the invention, along the circumference of the carrousel or along the conveyor belt there is provided a second guide means, such as a rail, via which a second robot arm is movable, by means of which teat cups which may have fallen down can be reconnected to the teats of an animal to be milked. According to an inventive feature, the second guide means is disposed along a sector of approximately 240° of the circumference of the platform. In an embodiment in accordance with the invention, the milk boxes are provided with a detector, such as a laser, an ultrasonic sensor, etc., for defining the teat coordinates of an animal in the relevant milk box. In accordance with a further inventive feature, the detectors are fitted in the floor of the carrousel or in that of the conveyor belt. According to an aspect of the invention, each milk box is provided with a milking robot. In accordance with again an other inventive feature, the milking robot is arranged near the inside of the milk box on the platform of the carrousel or near the conveyor belt.

Figure 2:
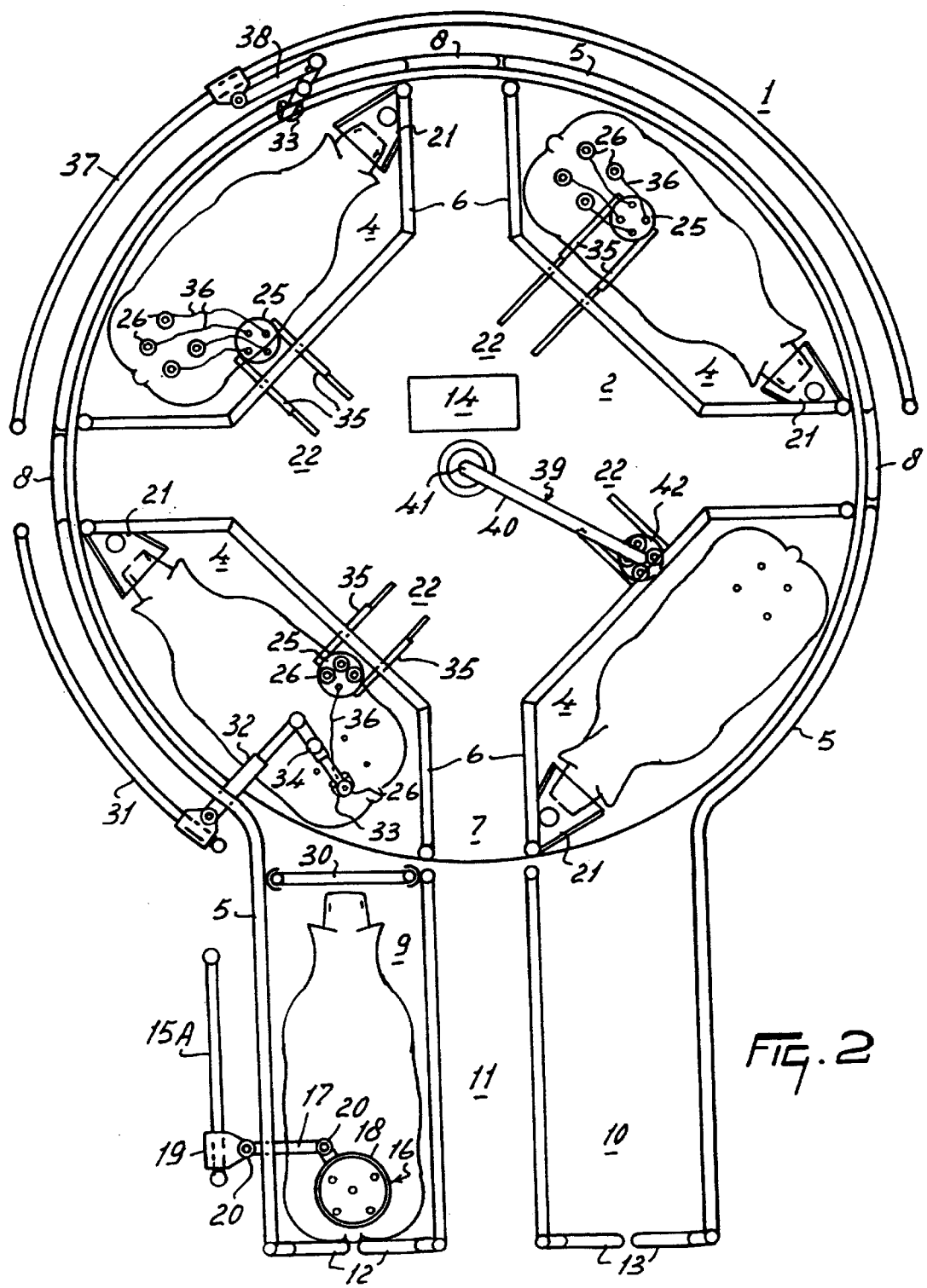

For a better understanding of the invention, reference will now be made to the accompanying drawings, in which:

FIG. 1 shows a plan view of a first embodiment of a milking carrousel according to the invention, and FIG. 2 shows a plan view of a second embodiment of a carrousel according to the invention.

FIG. 1 shows a plan view of a carrousel 1, which comprises a circular platform 2 which is rotatable about a central shaft 3 driven by a (non-shown) motor. On the platform 2 there are provided four milk boxes 4, which are confined at the outside of the platform 2 by a fixedly arranged curved fencing 5 which is connected to the outer circumference of the platform 2. The milk boxes 4 are further confined at their inside by also curved fencings 6, which abut on the outer fencing 5. The front side and the rear side of a milk box 4, which are confined by the fencing 6, are spaced apart from the rear side respectively the front side of an adjacent milk box 4. The distance between the front side of a fencing 6 of the milk box 4 and the rear side of a fencing 6 of the milk box 4 is such that there is created a walking path 7 via which an operating person can enter the platform 2. In order to make it possible to enter a walking path 7, the curved outer fencing 5 is interrupted at three places by a door 8. The carrousel 1 is further provided with an entrance gate 9 and an exit gate 10 for the animals, which gates are located at some distance next to each other. One side of the entrance and exit gate 9, 10 is constituted by a turned off part of the fencing 5, whereas the other side is constituted by a fencing 11. The entrance and exit gate 9, 10 are provided with an entrance and exit door 12, 13 respectively. Near the entrance door 12 there is arranged a (non-shown) cow identification system by means of which the identity of the animals can be established, whereafter there can be determined whether an animal is allowed to enter the entrance gate 9. With the aid of a computer 14, disposed near the shaft 3 of the platform 2, the computer-controlled entrance door 12 and the exit door 13 can be automatically controlled.

Near the entrance door 12, along the outer circumference of the platform 2 along a sector of approximately 45°, there is further provided a curved rail 15, via which a cleaning/foremilking device 16 can be moved together with the platform 2. By means of the cleaning/foremilking device 16 the teats and/or the udder can be washed and be foremilked. The cleaning/foremilking device 16 comprises a robot arm 17, which is provided at one end with a cleaning/foremilking element 18, capable of being connected to the udder and/or the teats, and at its other end with a guiding sleeve 19 which is movable via the rail 15. The robot arm 17 is further capable of pivoting on two substantially vertical hinge pins 20.

The milk boxes 4 are provided at their front sides with a feeding trough 21 over which there is arranged a (non-shown) concentrate rationing system, by means of which concentrate can be distributed to the animals in the milk box 4. On the fencing 6 of a milk box 4 there is further provided a milking robot 22, by means of which an animal can be automatically milked. The milking robot 22 comprises a robot arm 23, which at its free end is provided with a bearing surface 25 capable of pivoting on a vertical hinge pin 24 and carrying teat cups 26. At its other end the robot arm 23 is pivotably connected on a vertical hinge pin 27 with the fencing 6. The robot arm 23 further comprises a third vertical hinge pin 28. In the floor of the milk box 4 there is furthermore fitted a detector 29, such as a laser or an ultrasonic sensor, for defining the teat coordinates of an animal in the relevant milk box.

FIG. 2 shows a second embodiment of a carrousel 1 in accordance with the invention, in which embodiment parts corresponding to those shown in a first embodiment according to FIG. 1 are indicated by the same reference numerals.

In the present embodiment, near the entrance gate 9, the cleaning/foremilking device 16 is disposed so as to be movable via the rail 15A. At the front side of the entrance gate 9 there is provided a second entrance door 30 giving access to the platform 2 of the carrousel 1. The second entrance door 30 is controlled by the computer 14. Near the entrance gate 9, along a sector of approximately 45° of the circumference of the platform 2, there is provided a second rail 31 via which there can be moved a second robot arm 32 provided at its end with a gripper 33. The second robot arm 32 is provided with a detector 34, which is designed in the present embodiment as a laser, by means of which the teat coordinates of an animal to be milked can be defined.

Near the fencing 6 of a milk box 4 there is furthermore arranged a bearing surface 25 carrying teat cups 26, which bearing surface 25 is movable via two longitudinal guide means 35 which are disposed on the platform 2. By means of the gripper 33 the teat cups 26 can be removed individually from the bearing surface 25 and connected to the teats of an animal to be milked. Via withdrawing members 36 the teat cups 26 remain connected with the bearing surface 25. After milking has finished, the withdrawing members 36 are activated by the computer 14 in such a way that the teat cups 26 are drawn back to the bearing surface 25.

At some distance from the second rail 31, along a sector of approximately 240° of the circumference of the platform 2, there is provided a third rail 37, via which a third robot arm 38 including a gripper 33 and a detector 34 is movable. By means of the third robot arm 38 teat cups 26 which may have fallen down can be reconnected.

The carrousel 1 is further provided with a teat cup cleaning device 39 by means of which the teat cups 26, after having fallen down, or after having been used for milking, can be cleaned. The teat cup cleaning device 39 comprises an arm 40, which is connected at one end with a vertical shaft 41 disposed above the shaft 3 of a platform 2. The vertical shaft 41 is driven by a (non-shown) step motor, such that the teat cup cleaning device 39 can reach all the teat cups 26. At the end of the arm 40 there is a bearing surface 42 and therebelow there is located a (non-shown) spraying device which can be connected to the teat cups 26. By means of spraying nozzles of the spraying device a cleaning and/or disinfecting fluid can be guided into or along the teat cups 26. After the teat cups 26 have been cleaned, the teat cup cleaning device 39 is disconnected.

The speed of rotation at which the platform 2 is driven in the two embodiments by the (non-shown) motor is controlled by an adjusting mechanism included in the computer. The adjusting mechanism cooperates with the memory of the computer in which historical data regarding the estimated milking time or the estimated residence time are stored. In an alternative embodiment it is furthermore possible that in the memory of the computer there are stored historical data regarding the estimated milk yield, while the computer defines, on the basis of these data and the milk speed determined by a (non-shown) milk speed meter during milking, the estimated milking time. Hereby it is possible that the computer determines the estimated milking time or the estimated residence time, in the first case on the basis of the average milking time of the animals present in the carrousel, and in the second case on the basis of the average residence time of the animals in the carrousel. Moreover it is also possible that the computer determines the estimated milking time or the estimated residence time, in the first case on the basis of the longest estimated milking time of an animal in the carrousel, and in the second case on the basis of the longest estimated residence time of an animal in the carrousel.

In the present embodiments the carrousel 1 comprises four milk boxes; however, it will be obvious that the carrousel can comprise any number of milk and/or wash boxes.

Having disclosed my invention, what I claim is new and to be secured by Letters Patent of the United States is:

1. An Apparatus for milking animals, such as cows, comprising a movable floor including a milking compartment, a milking robot associated with said milking compartment that fully automatically milks animals received in said milking compartment including connecting teat cups to the teats of said animals in said milking compartment, an automatically operative adjusting mechanism for adjusting the motion of the movable floor selectively on the basis of the estimated milking time of the animal being milked on the movable floor or the estimated residence time of the animal being milked on the movable floor.

2. An apparatus as claimed in claim 1, wherein the movable floor comprises a conveyor belt that supports said animals while being milked by said milking robot.

3. An apparatus as claimed in claim 1, wherein the movable floor comprises a carousel.

4. An apparatus as claimed in claim 3, wherein said carousel comprises a platform and a central shaft connected to said platform, said platform being rotatable about said central shaft.

5. An apparatus as claimed in claim 1, comprising a computer having a memory in which historical data of said estimated milking time are stored, said adjusting mechanism cooperating with said computer.

6. An apparatus as claimed in claim 1, comprising a computer having a memory in which historical data of the estimated milk yield of the animal being milked are stored, and a milk flow rate meter which provides data to said computer of the rate that milk is received from said animal being milked, said computer determining the estimated milking time on the basis of said historical data and said milk flow rate data.

7. An apparatus as claimed in claim 1, comprising an entrance door for animals to move onto said movable floor and an exit door for animals to move from said movable floor, a computer, said computer controlling said entrance and exit doors.

8. An apparatus in accordance with claim 7, wherein said entrance door and said exit door are disposed adjacent each other.

9. An apparatus as claimed in claim 7, comprising an animal identification system which is disposed adjacent said entrance door.

10. An apparatus in accordance with claim 1, wherein said milking compartment is provided with detector means defining the coordinates of the teats of an animal in said milking compartment.

11. An apparatus in accordance with claim 10, wherein said detector means are on said movable floor.

12. An apparatus in accordance with claim 1, comprising a plurality of further milking compartments, each said further milking compartment being provided with a further milking robot.

13. An apparatus in accordance with claim 12, wherein each said milking robot is arranged adjacent a corresponding said milking compartment, each said milking robot including robot arm means connected to teat cups for moving said teat cups from outside of the corresponding milking compartment to inside such milking compartment for emplacing and removing said teat cups from the teats of an animal in said corresponding milking compartment.

14. An apparatus in accordance with claim 13, wherein the total number of milking compartments including said further milking compartment on said movable floor is four, and the total number of said milking robots including said further milking robots is also four, each said milking robot being adjacent a corresponding milking compartment.

15. An apparatus for milking animals, comprising a carousel including a plurality of milking robots and a plurality of milking compartments, each said milking compartment being associated with a said milking robot that fully automatically milks an animal in the associated milking compartment, an adjusting mechanism for adjusting the speed of rotation of the carousel selectively on the basis of the estimated milking time or the estimated residence time in the carousel of the animal being milked.

16. An apparatus for fully automatically milking animals, comprising a carousel, including a movable floor which supports the animals as they are being automatically milked, a milking robot that fully automatically milks animals while they are being supported on said movable floor, a plurality of milking compartments on said movable floor, the apparatus further consisting of one or more of the following components: a foremilking device, an udder massage device, an udder cleaning device and/or a concentrate rationing device.

17. An apparatus for milking animals, comprising a carousel which includes a plurality of milking compartments and a plurality of milking robots, an automatically operative adjusting mechanism for adjusting the rotational motion of said carousel selectively on the basis of the average milking time of the animals present on said carousel or on the basis of the average residence time of the animals on said carousel.

18. An apparatus for milking animals, comprising a carousel which includes a plurality of milking compartments and a plurality of milking robots, an automatically operative adjusting mechanism adjusting the motion of said carousel selectively on the basis of the longest estimated milking time of an animal on said carousel or on the basis of the longest estimated residence time of an animal on said carousel.

19. An Apparatus for milking animals, comprising a carousel, a plurality of milking compartments on said carousel, a plurality of milking robots on said carousel, said milking robots automatically connecting and disconnecting teat cups to and from said animals while they are being supported on said carousel, said carousel comprising a platform which supports said animals while being milked and a central shaft, said platform being rotatable about said central shaft.

20. An apparatus as claimed in claim 19, comprising a walkway for human operators on said platform between the fore and aft ends of two of said milking compartments.

21. An apparatus as claimed in claim 20, comprising a door adjacent the periphery of said carousel, said door providing access to said walkway.

22. An apparatus for milking animals, comprising a movable floor, including a milking compartment, a milking robot, and an automatically operative adjusting mechanism for adjusting the motion of the movable floor selectively on the basis of the estimated milking time of the animal being milked on the movable floor or the estimated residence time of the animal being milked on the movable floor, the apparatus further comprising a foremilking device, an udder massage device, and a concentrate rationing device.

23. An apparatus comprising a movable floor, including a milking compartment, a milking robot, and an automatically operative adjusting mechanism for adjusting the motion of the movable floor selectively on the basis of the estimated milking time of the animal being milked on the movable floor or the estimated residence time of the animal being milked on the movable floor, the apparatus further comprising an entrance door for animals to move onto said movable floor and an exit door for animals to move from said movable floor, a computer, said computer controlling said entrance and said exit doors, an animal identification system which is disposed adjacent said entrance door a guide means, said guide means disposed adjacent said floor and extending along said movable floor, said guide means having mounted thereon at least one of the following devices: (1) a foremilking device (2) an udder massage device, (3) an udder cleaning device and/or (4) a milking robot device.

24. An apparatus as claimed in claim 23, wherein said moving floor comprises a carousel having a circular platform, said guide means being disposed along a sector of approximately 45° of the circumference of said platform.

25. An apparatus as claimed in claim 23, comprising a further guide means disposed along said movable floor, a robot arm means mounted on said further guide means, said milking robot comprising teat cups which are emplaced on and removed from the teats of an animal in said milking compartment respectively before and after being milked by said milking robot, said robot arm means performing the function of reconnecting teats to the teats of an animal being milked when said teat cups fall from said teats.

26. An apparatus in accordance with claim 25, wherein said movable floor comprises a carousel having a circular platform, said further guide means being provided along a sector of at least about 180° around the circumference of said platform.

* * * * *